Figures 1, 2:
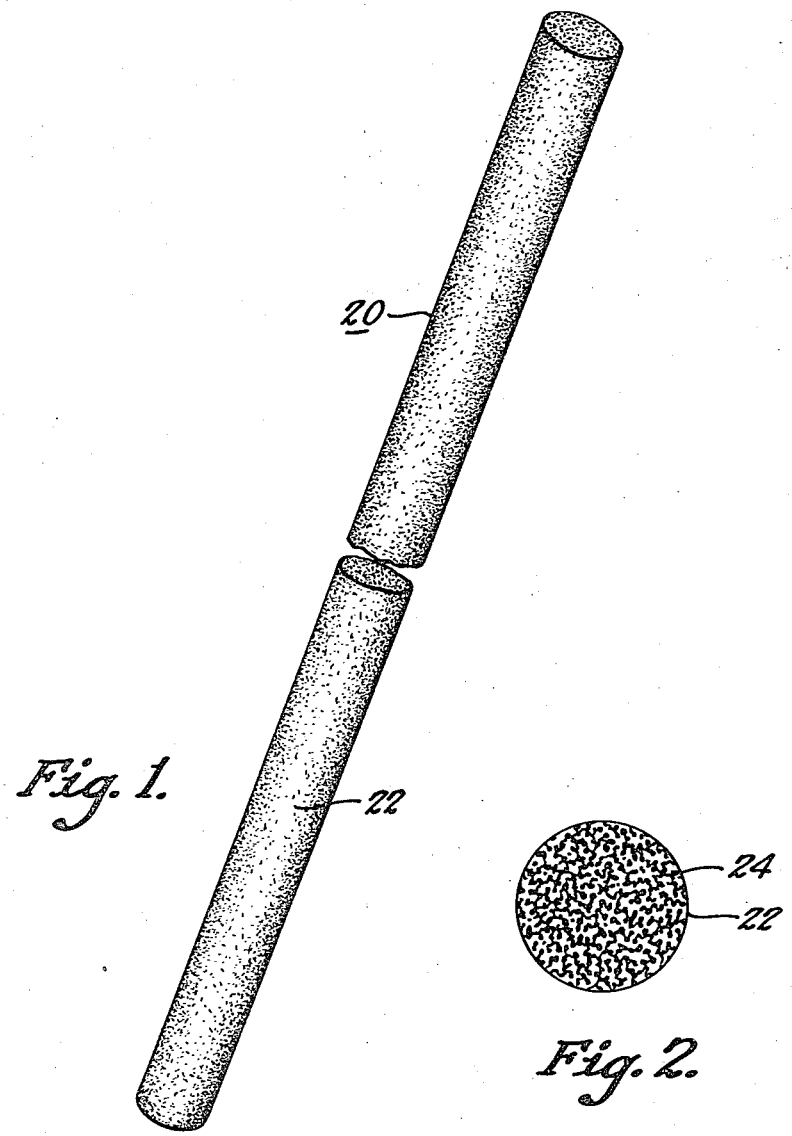

Nov. 21, 1939.    J. T. MARVIN    2,180,813
WELDING ELECTRODE
Filed Feb. 3, 1938

INVENTOR
John T. Marvin
BY
Spencer Hardman & Fehr
his ATTORNEYS

Patented Nov. 21, 1939

2,180,813

UNITED STATES PATENT OFFICE 2,180,813

WELDING ELECTRODE

John T. Marvin, Dayton, Ohio, assignor to General Motors Corporation, Detroit, Mich., a corporation of Delaware Application February 3, 1938, Serial No. 188,427

13 Claims. (Cl. 219—8)

The present invention relates to welding electrodes and more particularly to welding electrodes having suitable fluxing ingredients dispersed therethrough.

One of the objects of the present invention is to provide a method for fabricating a flux carrying welding electrode which includes the steps of molding powdered metal to form an electrode of the desired shape, sintering the molded electrode at a sufficiently high temperature to cause the metal powder to fuse together and thereby form a highly porous electrode of homogeneous character, and then impregnating such a porous metal electrode with suitable fluxing compounds so that the fluxing compounds penetrate into the pores of said electrode.

It is a further object of the invention, in some cases, to briquette finely divided metal powder, which has been intimately mixed with a volatile void producing compound, to produce a self-sustaining molded electrode, then sintering the molded electrode to simultaneously cause the metal powders to fuse together, and the void producing compound to volatilize, and thereby form a highly porous electrode, and then impregnating the porous metal electrode with suitable fluxing ingredients.

In carrying out the above objects it is a further object, in some instances, to remove the excess flux from the surface of the electrode after the impregnating step, and thereby provide a conducting surface on the electrode.

Another object of the invention is to form a porous metal electrode by sintering together finely divided metal powders, and then impregnating the porous metal electrode by immersing the same in a molten bath of flux, and thereby causing a uniform dispersion of the flux into the pores of the porous electrode.

In carrying out the above object it is a still further object to quench the impregnated electrode for removing the excess flux from the surface thereof, when a conducting surface is desired.

It is a still further object to provide a sintered welding electrode in which the non-metallic fluxing ingredients are uniformly dispersed throughout the entire cross-section thereof.

Another object of the invention is to provide a sintered welding electrode in which one of the metallic ingredients comprises iron, copper or aluminum in substantial quantities and which also includes fluxing ingredients uniformly dispersed throughout the electrode.

Further objects and advantages of the present invention will be apparent from the following description, reference being had to the accompanying drawing wherein a preferred embodiment of the present invention is clearly shown.

In the drawing:

Fig. 1 illustrates a welding electrode formed by sintering together powdered metal and impregnated with a suitable fluxing compound and, Fig. 2 is a photomicrographic representation of a section of the electrode illustrated in Fig. 1, showing the metallic network (dark areas) and the impregnated fluxing ingredients (light areas) therein.

Welding electrodes, or rods, as generally used in arc welding practice carry fluxing ingredients associated therewith to aid in the formation of the weld, improve the character of the weld metal and to produce a protective slag over the deposited weld metal and thereby prevent oxidation of the same. One of the past problems in this connection has been to provide a uniform distribution of these fluxing ingredients at the arc. This problem arises, due to the fact that the two usual methods of associating flux with a welding electrode are to provide a flux coating for the electrode, or to dispose the flux in a core within the electrode. In either type of electrode, that is coated or cored electrodes, the flux is segregated from the greater part of the metal of the electrode. Obviously such a disposition of the fluxing ingredients provides an excess of flux for the metal adjacent the coating or core, or too little flux for the metal which is not adjacent the coating or the core. Furthermore a flux coating on an electrode is not completely satisfactory, since the coating is easily chipped, or flaked off, during ordinary handling of the electrode. Then too, such coatings are usually non-conductive, and it is therefore necessary that a portion of the electrode remain uncoated so that an electrode holder may be attached thereto for introducing current into the electrode.

The cored type of flux carrying rod is undesirable due to its relatively higher production cost, and therefore is not used to any great extent. Many other alternatives have been suggested in the past such as notching the rod, cutting spirals in the rod, fluting the rod etc., in each case the indented part, or parts, being filled with fluxing ingredients. All of these alternative rods are expensive to produce, and have the same inherent disadvantages as the coated or cored electrodes.

The present invention is directed to the manufacture of the welding electrode 20 which preferably has a substantially continuous conducting surface 22 thereon, and which carries the flux susbtantially uniformly dispersed throughout the electrode, as noted in Fig. 2, wherein the light areas designate the flux. Such an electrode may be fabricated by mixing together the desired metallic constituents of the rod, in comminuted form, such as finely divided powder, and then loosely filling said mixed metallic constituents into a mold that has little or no bonding affinity for the metal powders, for example a graphite mold. The mold, with the loose powders filled therein, is next heated under non-oxidizing conditions in a furnace to cause the metal powders to sinter, or fuse together and thereby form a highly porous metallic electrode of good mechanical strength. After removal from the mold the electrode is impregnated with suitable fluxing ingredients, either by immersing the electrode in a vat containing the finely divided fluxing ingredients in a fluid state, or by passing the electrode through a die and extruding the fluxing ingredients in a plastic form into the pores thereof under high pressure.

When the immersion method of impregnation is utilized it is preferable to evacuate the pores of the electrode prior to its immersion into the flux and then supply high air pressure above the surface of the flux bath after immersing the electrode therein and thereby mechanically force the ingredients into the evacuated pores of the electrode. When the edectrode is impregnated by immersion, the flux may be dissolved in water if the ingredients are soluble therein, or some other suitable solvent such as alcohol, benzene etc., or, preferably, the fluxing ingredient may be in the molten state. Such flux ingredients as silica, in the presence of borax, sodium carbonate, resin, or other gums etc., may all be converted to the fluid state by sufficient heating thereof.

After the electrode has been impregnated, the surface of the electrode may be cleaned to remove any excess fluxing ingredients, thereby providing a substantially continuous conducting surface on the electrode. When an aqueous flux is used such a step may be carried out by passing the electrode through a rubber die of smaller diameter than the electrode, by manually wiping the electrode, etc. After immersion in the molten flux, the electrode may be quenched to remove excess flux, followed by wire brushing if desired. The finished electrode is then either air dried or cooled according to the method of impregnation.

In some cases it is preferable to briquette the metal powders, prior to the sintering step, and thereby cause the same to attain a self-sustaining shape which can be readily handled and stored. In this instance it is preferable to mix a volatile void producing compound with the powdered metal prior to briquetting. Such compounds as, ammonium chloride, salicyclic acid and salts thereof as well as fatty acids and suitable salts thereof may all be successfully used as volatile void producing compounds. When briquetted electrodes including such void producing compounds are sintered, the metal particles therein fuse together, while the void producing compounds volatilize to increase the porosity of the electrode. Electrodes made from briquetted metal powders are of sufficient mechanical strength to permit them to be subsequently heated and drawn into wire if desired, which may be impregnated with flux as heretofore described, either before or after the drawing operation.

In some cases, a portion of the fluxing ingredients used are highly refractory such as silica, ferro-titanium, magnesium oxide, etc. Such refractory ingredients may be included in the initial mixture with the metal powders if desired, and thereby held uniformly dispersed within the porous metal structure, or network, of the electrode after the same is sintered. The less refractory non-metallic fluxing ingredients are subsequently impregnated into the electrode as previously described. In other words, any fluxing ingredients that are not deleteriously affected at the sintering temperature may be included in the initial powdered metal mix.

Compounds such as magnesium carbonate can also be used for the dual purpose of a void producing compound and a fluxing ingredient, in this case the compound breaks down during sintering into magnesium oxide, which remains in the pores of the electrode, and carbon dioxide which escapes and thereby increases the porosity of the electrode.

Welding electrodes as hereinbefore described may be manufactured from numerous metal powders or alloys thereof. When a ferrous electrode is desired, iron powder is the basic ingredient with which any of the common alloying ingredients can be mixed for example, nickel, copper, cobalt, manganese, etc. In this instance the sintering temperature should be above the melting point of the lowest melting component metal and below the melting point of the iron. For example if copper is the lowest melting alloying ingredient a sintering temperature of 2000° F. is satisfactory. Carbon in any form may also be added to the initial mix to raise the carbon content of the electrode.

When an electrode is desired for use with brass or bronze such an electrode may be formed by using a predominance of copper powder with lesser amounts of tin powder, zinc powder etc. Likewise, aluminum is the predominant metal when the electrode is to be used in the welding of aluminum. In all cases, porous metal electrodes, which have chemical analyses closely approximating the analysis of similar electrodes formed by conventional alloying methods, may be fabricated from powdered metals.

Specific sintering temperatures are well known, together with suitable briquetting pressures and may be found in a number of patent disclosures, etc., for various metals or mixtures thereof and form no part of the present invention.

When manufacturing manual type welding rods, in graphite molds, it is unnecessary to use void producing compounds, since the metal powder is not compacted in the mold and therefore, is highly porous after sintering. Similarly the use of void producing compounds is often unnecessary when the metal electrodes are produced by sintering briquetted metal powders since briquetted electrodes have a porosity ranging up to 35% by volume. If such a rod will carry sufficient flux for a specific purpose it is obvious that no higher degree of porosity is required.

The degree of porosity of any of the aforementioned electrodes may be closely controlled by passing the electrode through pressure rolls after the sintering step to compact the electrode to some extent and thereby reduce the porosity thereof to any desired figure. Such a step may, or may not, be necessary according to the amount of flux desired to be carried by the rod and also to the method by which the rod is manufactured. Likewise powdered metal of various grain sizes may be used to obtain varying porosities. Large grain sizes produce highly porous electrodes, while small grain sizes yield an electrode of higher mechanical strength with slightly less porosity. The desired grain size may be determined by trial.

The terms "flux" or "fluxing ingredients" as used herein contemplates any of the usual ingredients that are associated with an electrode, such as slag forming ingredients, deoxidizers, reducing gas forming ingredients etc.

From the foregoing it will be apparent that I have provided an electrode which contains fluxing ingredients substantially uniformly dispersed throughout the entire cross-section of the same and which preferably has a substantially continuous conducting surface thereon. In the present electrode the fluxing ingredients are mechanically held within the electrode and therefore do not chip or flake off during handling as is the case in the usual type of flux carrying electrodes. Furthermore, electrodes fabricated by the herein defined method are of good mechanical strength and, due to the uniform dispersion of the flux, produce welds having a high degree of uniformity.

While the embodiments of the present invention as herein disclosed, constitutes preferred forms, it is to be understood that other forms might be adopted, all coming within the scope of the claims which follow.

What is claimed is as follows:

1. The method of making a flux carrying welding electrode, including the steps of; molding finely divided metal powder into the desired shape, sintering the molded powder to cause the same to fuse together and form a strong highly porous electrode of homogeneous character, and then impregnating the porous metal electrode with suitable non-metallic fluxing ingredients which solidify and are thereby held within the pores of the completed electrode.

2. The method of making a flux carrying welding electrode having a substantially continuous conducting surface thereon, including the steps of; intimately mixing finely divided metal powders comprising at least two metals of different melting points, molding the intimately mixed finely divided metal powders into the desired shape, sintering the molded powders at a temperature above the melting point of the lowest melting constituent powder to cause the powders to at least partially alloy and thereby form a strong highly porous electrode, impregnating the porous alloy electrode with suitable non-metallic fluxing ingredients, and then wiping the surface of the electrode to remove the excess fluxing ingredients and thereby provide a substantially continuous conducting surface.

3. The method of making a flux carrying welding electrode having a substantially continuous conducting surface thereon, including the steps of; briquetting finely divided metal powder which is intimately mixed with a volatile void producing compound to form an electrode of the desired shape, sintering the briquetted electrode to cause the same to fuse together and to cause the void producing compound to volatilize and thereby form a strong highly porous electrode of homogeneous character, impregnating the porous electrode with suitable non-metallic fluxing ingredients, and then wiping the surface of the electrode to remove the excess fluxing ingredients and thereby provide a substantially continuous conducting surface.

4. The method of making a flux carrying welding electrode including the steps of; molding finely divided metal powder together with a non-metallic refractory inorganic ingredient into the desired shape, sintering the molded powder to cause the same to fuse together and form a strong highly porous electrode having the said refractory inorganic ingredient uniformly dispersed therethrough, and then impregnating the porous metal electrode with suitable non-metallic fluxing ingredients of a less refractory nature than said aforementioned inorganic ingredient.

5. A method of making a flux carrying welding electrode having a substantially continuous conducting surface thereon, including the steps of; filling finely divided loose metal powder into a mold having little or no bonding affinity for the metal powder, heating the mold with the metal powder therein to a sintering temperature for causing the metal powder to sinter together and form a strong highly porous metal electrode, removing the highly porous metal electrode from the mold and then impregnating the porous electrode with suitable non-metallic fluxing ingredients.

6. A new article of manufacture comprising, a flux-carrying welding electrode including a sintered porous metal base, said electrode having the pores thereof substantially completely filled with non-metallic fluxing ingredients.

7. A new article of manufacture comprising, a flux-carrying welding electrode including a sintered porous metal base, said electrode having the pores thereof substantially completely filled with non-metallic fluxing ingredients and having a substantially continuous conducting surface.

8. A new article of manufacture comprising a highly porous sintered metal welding electrode, and including non-metallic and non-refractory fluxing ingredients substantially uniformly dispersed within the pores of the electrode and substantially completely filling the same and throughout the entire cross-section thereof, said welding electrode having a substantially continuous conducting surface.

9. A new article of manufacture comprising, a porous sintered metal flux carrying welding electrode, including a substantial percentage of iron, said electrode having suitable non-metallic and non-refractory fluxing ingredients impregnated within and substantially completely filling the pores thereof and having a substantially continuous conducting surface.

10. A new article of manufacture comprising a porous sintered metal flux carrying welding electrode, including a substantial percentage of copper, said electrode having suitable non-metallic and non-refractory fluxing ingredients impregnated within and substantially completely filling the pores thereof and having a substantially continuous conducting surface.

11. A new article of manufacture comprising a porous sintered metal flux carrying welding electrode, including a substantial percentage of aluminum, said electrode having suitable non-metallic and non-refractory fluxing ingredients impregnated within and substantially completely filling the pores thereof and having a substantially continuous conducting surface.

12. The method of making a flux carrying welding electrode, including the steps of: molding finely divided metal powder into the desired shape, sintering the molded powder to cause the same to fuse together and form a highly porous electrode of homogeneous character then immersing said porous metal electrode into a molten bath of non-metallic fluxing ingredients and thereby impregnating the same with said fluxing ingredients substantially completely throughout any cross-section of the electrode.

13. The method of making a flux carrying welding electrode, including the steps of molding finely divided metal powder into the desired shape, sintering the molded powder to cause the same to fuse together and form a highly porous electrode of homogeneous character, immersing said porous metal electrode into a molten bath of non-metallic fluxing ingredients and thereby impregnating the same with said fluxing ingredients substantially completely throughout any cross-section of the electrode, and then quenching the hot impregnated electrode in water to remove fluxing ingredients from the surface thereof for providing a conducting surface thereon.

JOHN T. MARVIN.